United States Patent [19]

Imamura et al.

[11] Patent Number: 5,340,891

[45] Date of Patent: Aug. 23, 1994

[54] CONTINUOUS POLYMERIZATION METHOD AND APPARATUS

[75] Inventors: Tsuyoshi Imamura, Yawata; Katsumi Mizuguchi; Yasuhiro Shibai, both of Osaka; Keizou Ishii, Ashiya; Shinichi Ishikura, Tsuzuki; Koichi Saito, Kyoto, all of Japan

[73] Assignee: Nippon Paint Co., Ltd., Osaka, Japan

[21] Appl. No.: 158,924

[22] Filed: Nov. 29, 1993

Related U.S. Application Data

[63] Continuation of Ser. No. 831,570, Feb. 5, 1992, abandoned.

[30] Foreign Application Priority Data

Feb. 5, 1991 [JP] Japan ................................. 3-14581
Oct. 22, 1991 [JP] Japan ................................. 3-274355

[51] Int. Cl.⁵ .............................. C08F 2/20; C08F 2/24
[52] U.S. Cl. ...................................... 526/88; 422/135; 422/136; 422/209; 422/225
[58] Field of Search ................... 526/88; 422/135, 136, 422/209, 224, 225

[56] References Cited

FOREIGN PATENT DOCUMENTS 230157  4/1982  Fed. Rep. of Germany .
923042  6/1947  France .
65551   4/1950  Netherlands .

Primary Examiner—Joseph L. Schofer
Assistant Examiner—David Wu
Attorney, Agent, or Firm—Vineet Kohli; Peter J. Gluck; Thomas R. Morrison

[57] ABSTRACT

Polymer particles having a small particle diameter and a narrow particle diameter distribution are obtained by a continuous polymerization method which does not accompany an increase of cohering products attaching to an inner face of a reaction vessel and an air-bubble invasion and, in which stirring of a material solution for polymerization is easy. An emulsion polymerization reaction or a suspension polymerization reaction is carried out by supplying a material solution for polymerization continuously to a clearance between coaxial double cylinders, which have stretched toward a direction crossing a horizontal plane, from the end side of the cylinders, by rotating at least one of the double cylinders round the axis and thereby, causing Taylor vortices. The polymer particles thus-formed are obtained by through the other end side of the double cylinders to the outside.

8 Claims, 6 Drawing Sheets

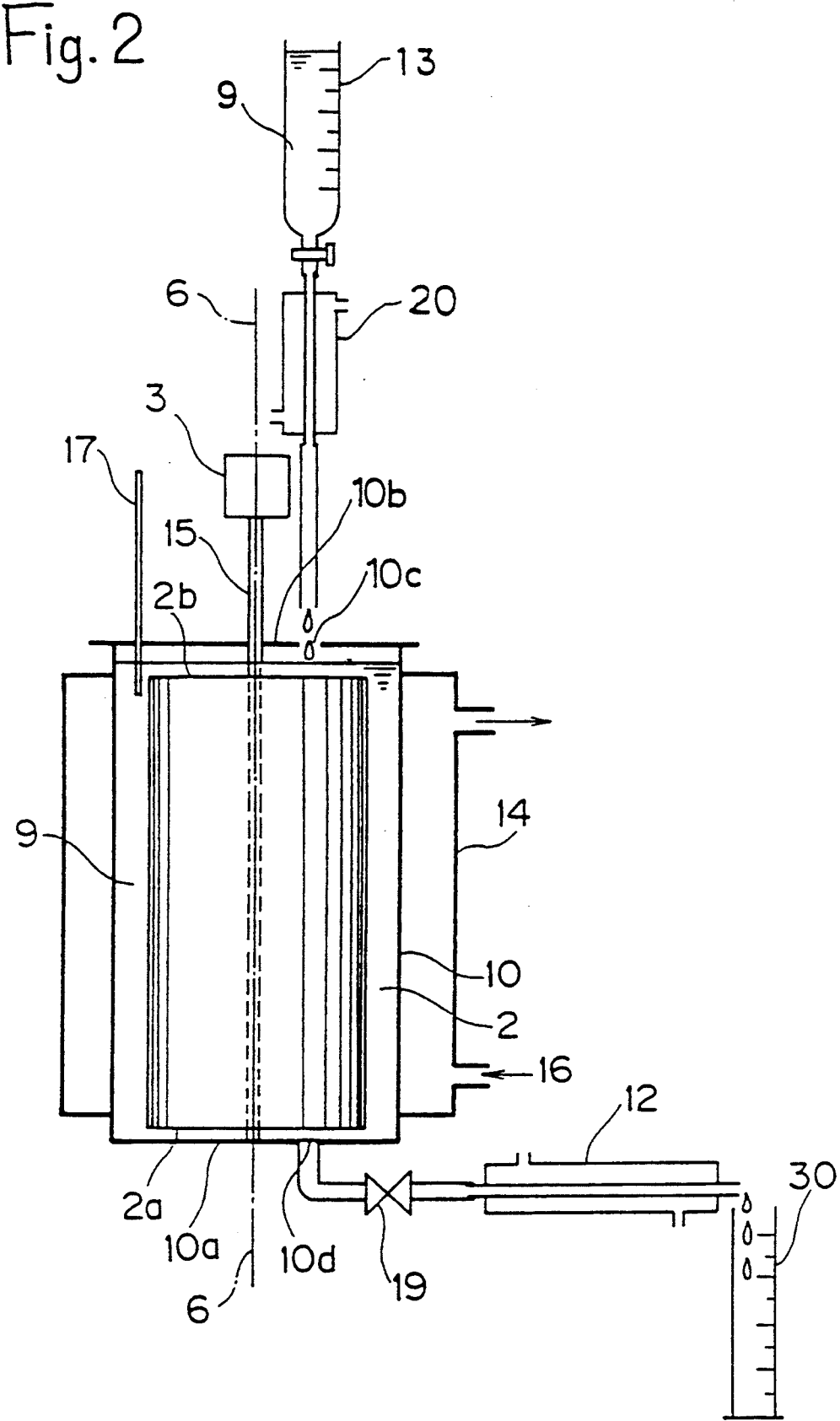

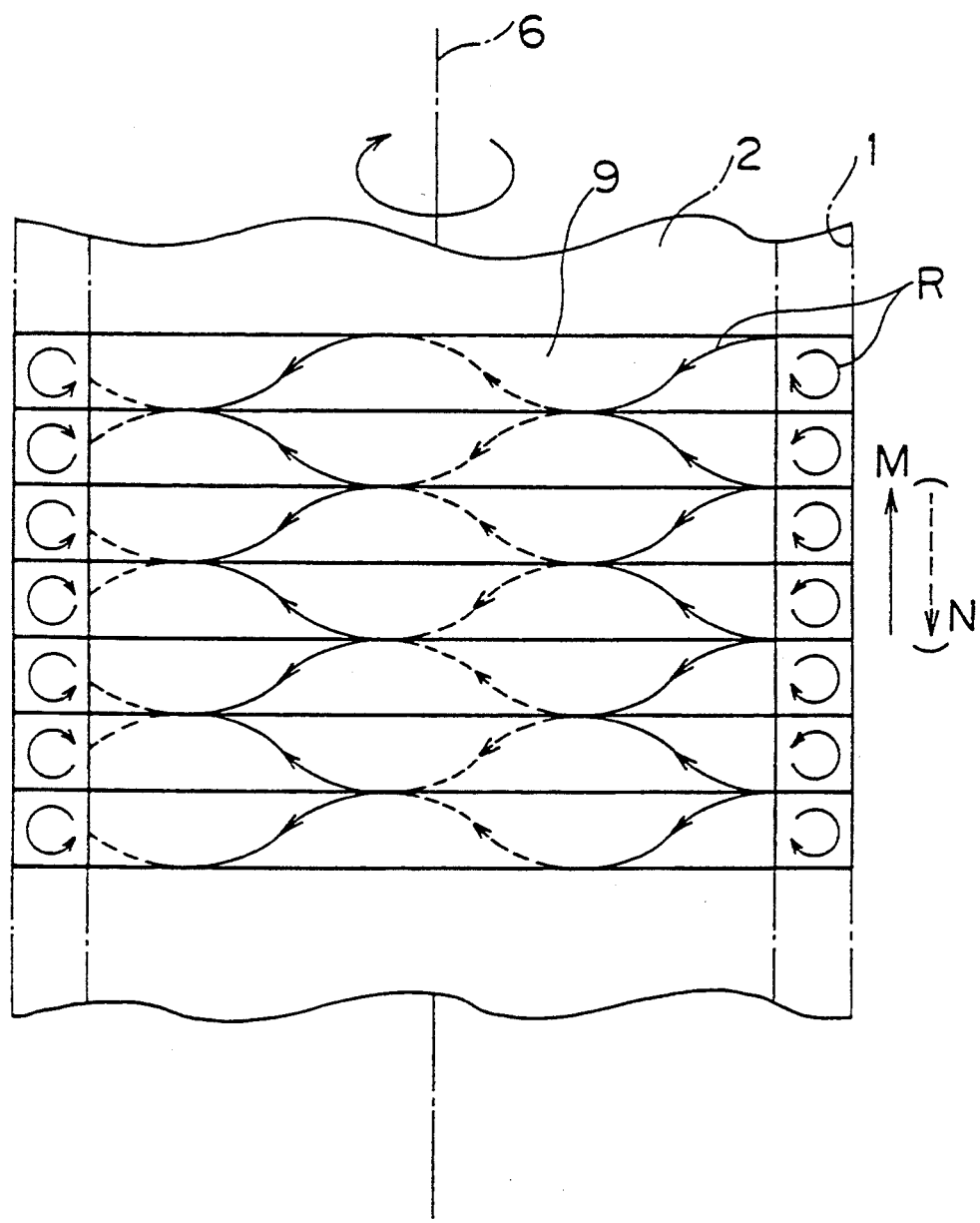

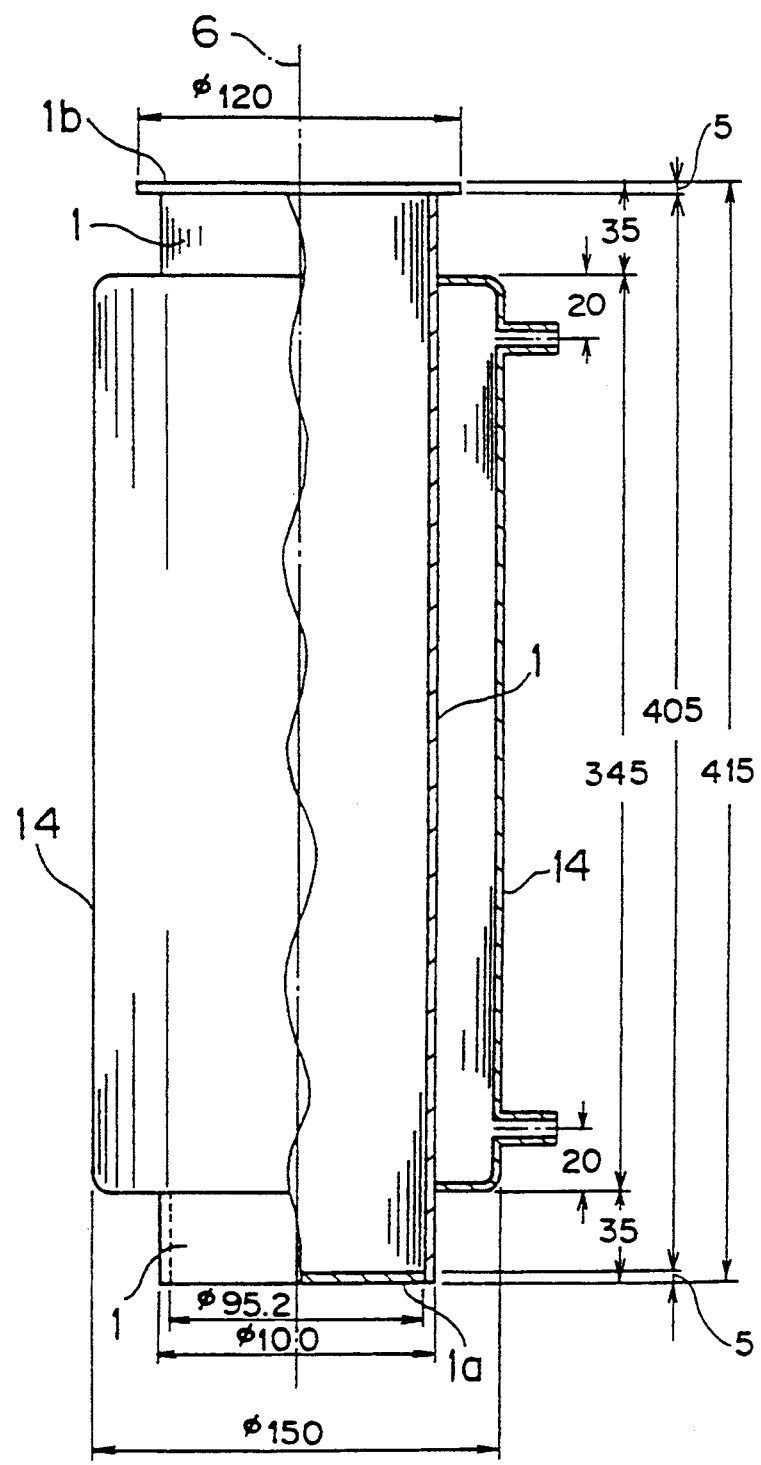

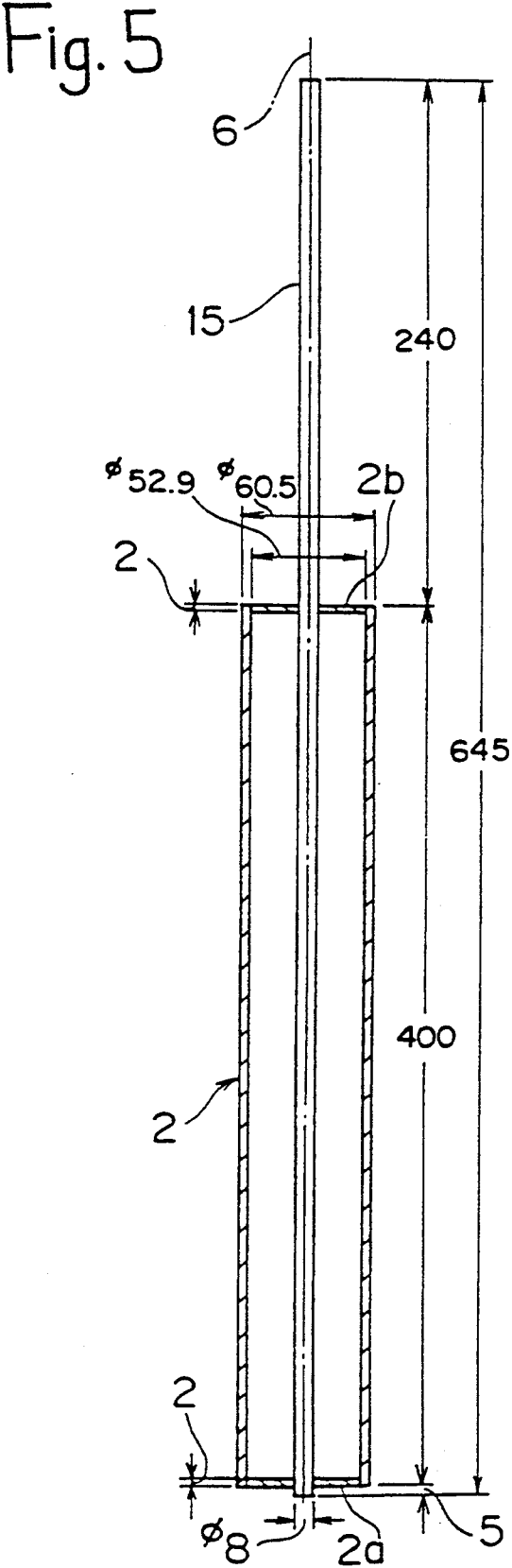

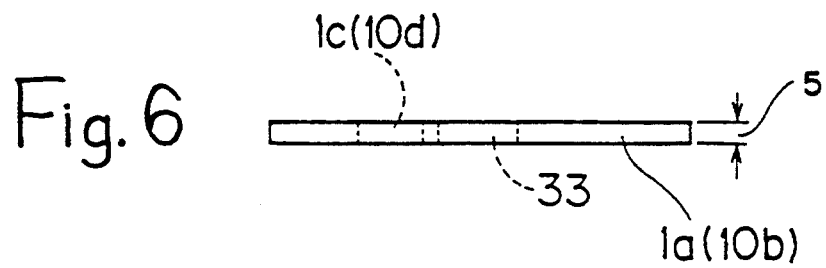
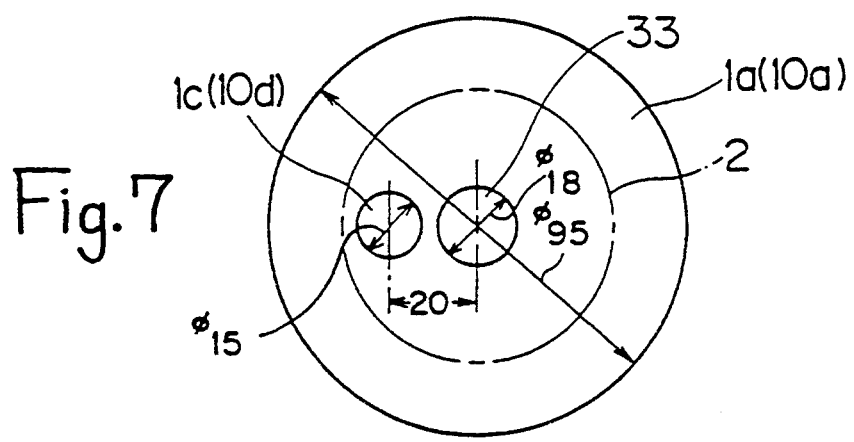
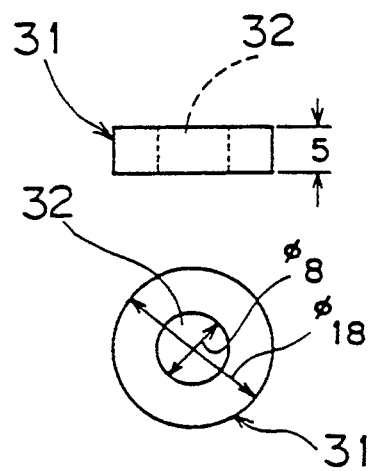

CONTINUOUS POLYMERIZATION METHOD AND APPARATUS

This is a continuation of co-pending application Ser. No. 07/831,570 filed on Feb. 5, 1992.

BACKGROUND OF THE INVENTION

The present invention relates to a method for obtaining continuously a particle type polymer by carrying out continuously an emulsion polymerization or a suspension polymerization of a material for polymerization containing a monomer under a flow condition using Taylor vortices and, furthermore, an apparatus to carry out the method.

Polymer particles having a relatively small particle diameter has been used for film formation, elevation of physical properties such as water resistance, acid resistance, and heat resistance, etc., various kinds of controlling agents for viscosity, surface activity, and dispersion, etc. Polymer particles of these kinds need to have a particle diameter distribution as small as possible. This necessity is because of the effectiveness in obtaining an emulsion of relatively high viscosity and also, of the effectiveness in using as a minute spacer and in obtaining a special optical effect (rainbow luminescence etc.).

On the other hand, polymer particles are used having a relatively large particle diameter are used by adding these to a coating or a film as a plastic pigment or as an agent for affording uneven irregularities to a surface. This use is not to obtain a continuous film by using the polymer particles in a molding process, but to use particles that keep their own shape until a final stage.

Although polymer particles having a narrow particle diameter distribution are in many cases desired as the above-described polymer particles, if they are prepared by classifying with sieves or by other kinds of processes, the process becomes complex and also, because the proportion of effective components in products decreases, it is economically unfavorable. Accordingly, a polymerization working process to get polymer particles having a narrow particle diameter distribution has been desired.

To produce polymer particles having a relatively small particle diameter, there has been generally adopted an emulsion polymerization reaction. To produce polymer particles having a relatively large particle diameter, there has been generally adopted a suspension polymerization reaction.

Conventional arts of the emulsion polymerization have been mentioned, for example, in a book entitled as "ENCYCLOPEDIA OF POLYMER SCIENCE AND ENGINEERING", vol. 6, pp. 1 to 51, edited by Jacqueline I. Kroschwitz et al., published by John Wiley & Sons.

The emulsion polymerization is usually a method for producing polymer particles under a condition that an emulsifier, a monomer, and a water-soluble initiator coexists in a water medium, and it has been known as a method for producing small particles of from several ten nanometer to several micrometer.

Conventional arts of the suspension polymerization have been mentioned, for example, in a book entitled as "ENCYCLOPEDIA OF POLYMER SCIENCE AND ENGINEERING", vol. 16, pp. 443 to 473, edited by Jacqueline I. Kroschwitz et al., published by John Wiley & Sons.

The suspension polymerization is a method which comprises adding a hydrophobic monomer in a water medium, dispersing the monomer with stirring, and carrying out a polymerization reaction inside drops of a dispersed solution, and it has been known as a method for preparing particles having a size of a micrometer or larger. As the reaction operation, although it is a polymerization working procedure in a liquid-liquid heterogeneous phase system, an industrially important reaction is in particular a radical polymerization reaction of a monomer having a polymerizable ethylenic carbon-carbon double bond.

It is said that the reaction mechanism of suspension polymerization can be treated in a similar way to a case of bulk polymerization, and that the molecular structure of an obtained polymer is also similar to that of a polymer obtained from the bulk polymerization. Regarding heat transfer, the suspension polymerization differs from the bulk polymerization and solution polymerization and, because the whole system does not convert into a viscous liquid, there is obtained a completely mixing condition, so that there is no serious problem.

A batch method is a preferable main current method for industrially obtaining a polymer by the emulsion polymerization or suspension polymerization. Because, compared with the batch method, a continuous method has difficulty in controlling emulsion conditions or suspension conditions and has a defect of barely getting polymer particles having a desired particle diameter.

However, if the emulsion polymerization or suspension polymerization is carried out by a continuous method, there is an advantage that, compared with the batch method, a large amount of polymer particles can be obtained in a short period of time. Accordingly, if the above defects are overcome, it becomes possible to carry out industrially a continuous polymerization method, so that unmeasurably large benefits are obtained in industry.

There have been proposed, as the continuous polymerization method, several methods such as a method which involves a pipe type reaction vessel, a method which involves a continuous bath type reaction vessel, and a method which involves a loop type reaction vessel, etc. The continuous polymerization method using a pipe type reaction vessel is a method which comprises running continuously a material for polymerization containing a monomer into a pipe having an uniform section and diameter, that is a reaction vessel, and carrying out the emulsion polymerization or suspension polymerization in an interior of the pipe. The continuous polymerization method using a continuous bath type reaction vessel is a method which comprises connecting a number of reaction baths having a stirring means in series, supplying continuously ana successively a material solution into each of the reaction baths, and carrying out the emulsion polymerization or suspension polymerization successively in each of the reaction baths. The continuous polymerization method using a loop type reaction vessel is a method which comprises supplying a material solution into a loop type pipe, circulating the material solution in the pipe to carry out the emulsion polymerization or suspension polymerization, and then, leading the solution to an outside of the pipe.

A problem in conventional arts to be solved is that the particle diameter distribution of a polymer is broad, especially that large particles are very much formed. A reason for this problem is that polymerization reaction time is not uniform by varying with particles (especially, in a case of the emulsion polymerization), or that mixing occurs among liquid drops, that is a phenomenon of dispersion and unification of liquid drops in polymerization. The unification of dispersed liquid drops has been considered as occurring with considerable frequency and, especially, if the polymerization extent becomes 20% or more, the adhesion among particles becomes remarkable and, because of increasing viscosity of drops, redispersion of drops barely occurs and, therefore, there exists a trend of finally gathering together. Thus, an emulsifier or a stabilizer (these are also called as a suspending agent or a protecting agent) is added in order to stabilize the dispersed solution.

Since an unfavorable effect is afforded to the working procedure and quality of products if selection and an amount for use of an emulsifier and a stabilizer are in error, it is desired to keep the amount for use at minimum. However, when the liquid drops are dispersed by violent turbulence such as shear dispersion and turbulence dispersion, collision and reunification of dispersed liquid drops occur with considerable frequency and, therefore, to prevent gathering together of drops and, thereby, to prevent an impossibility of the working, a large amount of the emulsifier and stabilizer must be employed. Accordingly, a working process for a polymerization reaction, with which the collision and reunification of liquid drops are minimized, has been desired.

Although the continuous polymerization method using a pipe type reaction vessel gives polymer particles having a small particle diameter (for example, an average particle diameter of 30 nm), as a ratio of pipe length to pipe diameter (L/D) becomes larger, a product cohering at an inner face of a reaction vessel increasingly generates and, in particular, as the solid portion percentage becomes higher, the cohering product immediately generates and accumulates. Thus, air bubbles easily invade into a material solution for polymerization, or there occurs difficulty in stirring the material solution for polymerization. If the cohering product generates largely, frequent stopping of the reaction apparatus and removal of the product is needed, so that this situation is very fruitless. The cohering product becomes less if the L/D ratio becomes small, but in doing so, the flow of a material solution must be slow in order to secure the reaction time and, as a result, there is not significant difference between this continuous method and a batch method. If air bubbles invade a material solution for polymerization, the cohering product easily generates. Also, stirring of the material solution is necessary in order to accelerate heat transfer and to prevent an one-sided reaction temperature.

In the continuous polymerization method using a continuous bath type reaction vessel, a cohering product on an inner face of the reaction vessel is in a small amount, air bubbles do not invade a material solution for polymerization, and stirring of the material solution for polymerization is easy. However, since the polymerization is carried out by supplying a material solution to each of reaction vessels in sequence, not only polymer particles having a small particle diameter are obtained, but also large polymer particles are obtained simultaneously, so that the particle diameter distribution of obtained polymer particles is broad.

In the continuous polymerization method using a loop type reaction vessel, polymer particles having a small particle diameter can not be obtained, a cohering product easily accommodates at an inner face of the reaction vessel. air bubbles easily invade a material solution, and it is hard to stir the material solution.

OBJECTS AND SUMMARY OF THE INVENTION

Accordingly, it is the first object of this invention to provide a continuous polymerization method, comprising: resolving defects that conventional batch methods have; being capable of obtaining polymer particles having a small particle diameter and a narrow particle diameter distribution; a product cohering at an inner face of a reaction vessel being in a very small amount; air bubbles riot invading into a material solution for polymerization; and the material solution for polymerization being easily stirred. Also, the second object of this invention is to provide an apparatus for bringing this method in practice.

To attain the above objects, the present inventors have considered that, when the emulsion polymerization or suspension polymerization is continuously carried out, is essential to lead a material solution to a sufficiently and completely mixing condition which is necessary for obtaining a particle type polymer; and thus, they examined a method to realize this mixing condition. In the examination process, the inventors considered utilizing a phenomenon that, if at least one cylinder of a coaxial double cylinder is rotated to stir a material solution during a polymerization reaction, a liquid placed into a clearance between an inner and an outer cylinders of the double cylinder causes a run. The liquid run of this kited by rotating a double cylinder shows several types such as a layer flow by which the whole fluid draws uniformly a circular orbit round the axis, a flow causing Taylor vortices, and a disordered run. The inventors repeated a work of carrying out continuously the emulsion polymerization or suspension polymerization by utilizing these various runs and, as a result, they have found that, when the flow causes Taylor vortices, can the forementioned completely mixing condition can be realized. The present invention was completed on a basis of this finding.

Accordingly, in order to solve the first object, there is provided a continuous polymerization method, which comprises supplying a material solution for polymerization continuously from one end side of a coaxial double cylinder to a clearance existing between an inner cylinder and an outer cylinder of the double cylinder, which stretches toward a direction crossing a horizontal plane; carrying out continuously an emulsion polymerization or a suspension polymerization while rotating at least one cylinder of the double cylinder round the axis to cause Taylor vortices in the material solution for polymerization; and leading continuously a reaction solution containing a formed polymer from the other end side of the double cylinder to an outside; whereby polymer particles are continuously obtained.

In this continuous polymerization method, the material solution for polymerization can be supplied either from the upper end side of the double cylinder or from the lower end side of it. Usually, in a case of being supplied from the upper end side, a reaction solution is taken out from the lower end side and, in a case of being supplied from the lower end side, it is taken out from the upper end side. From a viewpoint of minimizing the formation of a cohering product, it is especially preferred to supply the material solution from the lower end side of the double cylinder and lead the reaction solution from the upper end side to the outside.

In order to solve the second object, the present invention provides an apparatus for a continuous polymerization with an application of Taylor vortices, which comprises a reaction vessel main body having a cylinder type inner face and being set so that its center axis has a direction crossing a horizontal plane; an inner cylinder capable of rotating, which has an outer face making a coaxial double cylinder with the inner face of the main body and of which lower end face is closed; a rotating means to rotate the inner cylinder round the forementioned axis; on either one of the upper and lower end faces of the main body, an inlet for supplying a material solution for polymerization being set at a position corresponding to an end face of the inner cylinder; carrying out continuously an emulsion polymerization or a suspension polymerization while causing the Taylor vortices in a clearance existing between the inner cylinder and the outer cylinder of the double cylinder by rotating the inner cylinder.

In this continuous polymerization apparatus of present invention, it is preferred that the upper end side (an upper face) of the inner cylinder is also closed and, on an upper face of the reaction vessel main body, an outlet for taking out is set at a position corresponding to the upper face of the inner cylinder.

In the continuous polymerization method of present invention and in a case where the suspension polymerization is carried out, a material solution for polymerization is supplied as a material-suspended solution obtained by suspending a part or the whole of a material for polymerization in water beforehand by using a dispersing machine, etc. According to this method, a process of obtaining a material-suspended solution by suspending a material solution and a polymerization process to minimize collision among particles and reunification of those can be separated. Because of this, it is possible to add a strong force for dispersing and a minimum stirring force by the Taylor vortex to a suspended solution. This method is effective in determining the particle diameter and particle diameter distribution of a suspended solution by dispersion at specific values and in obtaining these values themselves as properties of the particle and, the method is preferred in obtaining suspended particles having a narrow particle diameter distribution.

In the continuous polymerization method and apparatus of present invention, it is preferred to arrange a jacket for heating and cooling on an outside face of the reaction vessel main body.

A continuous polymerization apparatus of the present invention may be such that a dispersing machine to prepare a material-suspended solution by suspending a reaction material in water is combined with a reaction vessel main body.

A preferable continuous polymerization apparatus of the present invention may be such that jackets for heating and cooling are arranged on the outside face of a reaction vessel main body by dividing this outside face into several areas along a direction of a proceeding material solution.

The monomer used in this invention is an ethylene-based unsaturated monomer, and preferable examples of this are, for example, a monovinyl aromatic monomer; a unsaturated carboxylic acid such as acrylic acid and methacrylic acid, etc.; an ester monomer of these acids; a vinyl ester monomer, a vinyl ether monomer; a diolefin monomer; a monoolefin monomer; a halogenated olefin monomer; a polyvinyl monomer; a polyfunctional monomer (but the olefin monomer and polyvinyl monomer are omitted), etc. These compounds are used alone or by combining two or more kinds.

Preferable monovinyl aromatic monomers are, for example, the monovinyl aromatic compounds represented by the following (1) formula. Their practical examples are, for example, styrene, α-methylstyrene, vinyltoluene, α-chlorostyrene, o-, m-, or p-chlorostyrene, p-ethylstyrene, and sodium styrenesulfonate, etc, and they are used alone or in combination of two or more kinds.

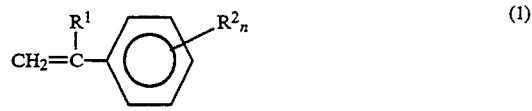

(1)

(In the formula, $R^1$ denotes a hydrogen atom, a methyl group, or a halogen atom; $R^2$ denotes a hydrogen atom, a lower class alkyl group (carbon number of 1 to 6), a halogen atom, an alkoxy group, an amino group, a nitro group, a carboxy group, or a sulfonic acid group. n is an integral number of from 1 to 5 and, in a case where n is from 2 to 5, $R^2$ does not need to be an identical number.)

Preferable unsaturated carboxylic acids such as acrylic acid and methacrylic acid and these ester monomers are, for example, acrylic-based monomers represented by the following (2) formula. Practical examples of these monomers are, for example, acrylic acid, methacrylic acid, methyl acrylate, butyl acrylate, 2-ethylhexyl acrylate, cyclohexyl acrylate, phenyl acrylate, methyl methacrylate, hexyl methacrylate, 2-ethylhexyl methacrylate, 2-hydroxyethyl acrylate, 3-hydroxybutyl acrylate, 4-hydroxybutyl acrylate, 2-hydroxyethyl methacrylate, 3-aminopropyl acrylate, and 3-diethylaminopropyl acrylate, etc., and these compounds are used alone or in combination of two or more kinds.

(2)

(In the formula, $R^3$ denotes a hydrogen atom or a methyl group; $R^4$ denotes a hydrogen atom, a hydrocarbon group having a carbon number of 12 or less, a hydroxyalkyl group, a vinyl ester group, or an aminoalkyl group.)

Preferable vinyl ester monomers are, for example, vinyl esters represented by the following formula (3). Practical examples are, for example, vinyl formate, vinyl acetate, and vinyl propionate, etc., and these compounds are used alone or in combination of two or more kinds.

$CH_2=CH-O-CO-R^5$ (3)

(In the formula, $R^5$ denotes a hydrogen atom or a lower class alkyl group having a carbon number of from 1 to 6.)

Preferable vinyl monomers are, for example, vinyl ethers represented by the following formula (4). Practical examples are, for example, vinyl methyl ether, vinyl ethyl ether, vinyl n-butyl ether, vinyl phenyl ether, and vinyl cyclohexyl ether, etc., and these compounds are used alone or in combination of two or more kinds.

$CH_2=CH-O-R^6$ (4)

(In the formula, $R^6$ denotes a monovalent hydrocarbon group, having a carbon number of 12 or less.)

Preferable diolefin monomers are, for example, diolefins represented by the following formula (5). Practical examples are, for example, butadiene, isoprene, and chloroprene, and these compounds are used alone or in combination of two or more kinds.

$$CH_2=C(R^7)-C(R^8)=CH-R^9 \quad (5)$$

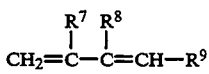

(In the formula, $R^7$, $R^8$, and $R^9$ independently denote a hydrogen atom, a lower class alkyl group having a carbon number of from 1 to 6, or a halogen atom.)

preferable monoolefin monomers are, for example, monoolefins represented by the, following formula (6). Practical examples are, for example, ethylene, propylene, butene-1, pentene-1, and 4-methylpentene-1, etc., and these compounds are used alone or in combination of two or more kinds.

$$CH_2=C(R^{10})-R^{11} \quad (6)$$

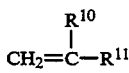

In the formula, $R^{10}$ and $R^{11}$ independently denote a hydrogen atom or a lower class alkyl group having a carbon number of from 1 to 6.)

Preferable halogenated olefin monomers are, for example. vinyl chloride and vinylidene chloride, etc., and these compounds are used alone or in combination of two or more kinds.

Preferable polyvinyl monomers are, for example, divinylbenzene, diallyl phthalate, and triallyl cyanulate, etc., and these compounds are used alone or in combination of two or more kinds.

The forementioned polyfunctional monomers are compounds having intramolecularly two or more of an ethylenic unsaturated group capable of undergoing radical polymerization and compounds other than the diolefin-based monomers and polyvinyl-based monomers. Practical examples are, for example, polymerizable unsaturated monocarboxylic acid esters of polyvalent alcohols such as ethylene glycol diacrylate, ethylene glycol dimethacrylate, triethylene glycol dimethacrylate, tetramethylene glycol dimethacrylate, 1,3-butylene glycol dimethacrylate, trimethylolpropane triacrylate, trimethylolpropane trimethacrylate, 1,4-butanediol acrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, pentaerythritol, triacrylate, pentaerythritol trimethacrylate, pentaerythritol tetracrylate, pentaerythritol tetramethacrylate, glycerol diacrylate, glycerol dimethacrylate, 1,1,1-t ris(hydroxymethylethane) diacrylate, 1,1,1-t ris(hydroxymethylethane) dimethacrylate, 1,1,1-ris(hydroxymethylethane) triacrylate, 1,1,1-tris(hydroxymethylethane) trimethacrylate, 1,1,1-tris(hydroxymethylpropane) diacrylate, and 1,1,1-tris(hydroxymethylpropane) dimethacrylate, etc.; polymerizable unsaturated alcohol esters of polybasic acids such as diallyl terephthalate, diallyl phthalate, and triallyl trimellitate, etc.; aromatic compounds substituted by two or more of a vinyl group such as divinyl benzene; compounds resulted from addition reactions between ethylenic unsaturated monomers containing an epoxy group such as glycidyl acrylate and glycidyl methacrylate, etc. and ethylenic unsaturated monomers containing a carboxyl group such as acrylic acid, methacrylic acid, crotonic acid, and maleic acid, etc., and these compounds may be used alone or in combination of two or more kinds.

In this invention, when the emulsion polymerization is carried out, useful emulsifiers are, for example, a nonionic surfactant, an anionic surfactant, a cationic surfactant, and an amphoteric surfactant, etc., and both of a reactive and a unreactive emulsifier can be used and these agents may be used alone or in combination of two or more kinds.

In this invention, when the emulsion polymerization is carried out, preferable polymerization initiators are, for example, an azo-based initiator and a peroxide-based initiator in a case of water-soluble ones and, they are any optional one in a case of oil-soluble initiators which are used together with the water-soluble ones, and they are used alone or in combination of two or more kinds.

In the continuous polymerization method of this invention, when the emulsion polymerization is carried out, all usual polymerization processes can be used. For example, a monomer and an emulsifier may be separately supplied to a reaction vessel, or a monomer and an emulsifier may be pre-emulsified beforehand and then, supplied to a reaction vessel. Also, a seeded emulsion polymerization method may be used. The seeded emulsion polymerization method is, for example, a method in which a material solution for polymerization containing nucleus particles for polymerization obtained by undergoing emulsion polymerization of a part of the polymerization material is supplied. Especially, the emulsion polymerization by the seeded method is preferable from a viewpoint of intending monodisperse of particles. That is, the particle diameter becomes smaller by the seeded method and also, the particle diameter distribution becomes narrow. This is because a monomer, that is a material, is quickly absorbed by the nucleus particles and because it is possible to suppress generation of new particles in a water phase that is a dispersion phase.

In this invention, when the emulsion polymerization is carried out, a material solution for polymerization is prepared by using the forementioned monomer, emulsifier, polymerization-initiator, and chemicals which are, if necessary, used, in a proper proportion and by a proper method. In a case of a material for polymerization containing nucleus particles for polymerization (a case of the forementioned seed method), the material solution for polymerization is prepared by mixing an emulsified solution containing nucleus particles obtained by carrying out emulsion polymerization of a part of the material for polymerization (hereinafter, may be said as "seed emulsion") and a residual material for polymerization. This mixing may be carried out beforehand before supplying for a reaction vessel, or carried out in a reaction vessel after supplying separately for the reaction vessel.

The seed emulsion is prepared, for example, by warming an aqueous monomer solution having a monomer concentration of about 10% by weight or less up to a suitable initiator-decomposing temperature and by adding an initiator solution (an aqueous solution in a case where the initiator is water-soluble and, in a case where it is oil-soluble, a solution by an organic solvent) having an optional concentration at a stretch. If necessary, an emulsifier may be used with the monomer to stabilize particles.

Here, the nucleus particles are, for example, non-crosslinked polymer particles and crosslinked polymer particles obtained from the emulsion polymerization, and they may be used alone or in combination of two or more kinds.

A stabilizer of this invention used in carrying out suspension polymerization is used with a purpose of decreasing an interfacial tension between a dispersed phase and a continuous phase, covering the surfaces of drops, preventing unification with other drops, and moderating unification of drops by increasing viscosity of the continuous phase. Therefore, a preferable stabilizer is one that does not interfere with a polymerization reaction and does not decrease working efficiency and quality of products. Practical examples are a water-soluble macromolecule such as polyvinyl alcohol, polyacrylic acid, polymethacrylic acid, gelatine, tragacanth, methylcellulose, and polymethacrylamide, etc.; talc, bentonite, silic acid, diatomaceous, clay, $BaSO_4$, Ai-$(OH)_3$, $CaSO_4$, $BaCO_3$, $MgCO_3$, $Ca(PO_4)_2$, and $CaCO_3$, etc. If necessary, a surfactant such as a nonionic surfactant, an anionic surfactant, a cationic surfactant, and an amphoteric surfactant, etc. may be jointly used and, in this case, the surfactants may be either reactive or non-reactive and they are used alone or in combination of two or more kinds.

Preferable oil-soluble polymerization initiators using in the suspension polymerization of present invention are, for example, an oily azo compound such as azobis-(isobutyronitrile), 2,2′-azobis(2-methylbutyronitrile and 2,2′-azobis (2,4-dimethylvaleronitrile), etc.; and an oily peroxide such as benzoyl peroxide, p-chlorobenzoyl peroxide, lauroyl peroxide, and tert-butyl perbenzoate, etc. and they are used alone or in combination of two or more kinds. Also, if necessary, an optional water-soluble polymerization initiator [for example, a water-soluble peroxide such as potassium persulfonate and ammonium persulfonate; a water-soluble azo compound such as 4,4′-azobis (4-cyanovaleric acid) (in an anionic series) and 2,2′-azobis(2-methylpropionamidine) (in a cationic series) ] may be jointly used with an oil-soluble initiator.

A material solution for polymerization used in carrying out suspension polymerization in the present invention is prepared by using the above-mentioned monomer, stabilizer, polymerization initiator, and other chemicals which are used in case of necessity, in a proper proportion.

The operation of obtaining a suspended solution may be carried out in a reaction vessel after components of the material for polymerization are separately supplied for this reaction vessel, but it is preferred to carry out this operation beforehand before supplying the material to the reaction vessel. The apparatus using in dispersion may be such as being commonly used, and its examples are a dispersing machine using a impeller, a dispersing machine for which an ultrasonic wave is applied, and a dispersing machine for which cavitation is applied. Especially, when it is desired to make the particle diameter distribution narrow , a pressing type dispersing machine and a pushing-out liquid-liquid dispersing machine, in which a thin pipe or a thin hole is used, are preferably used. The components of the material for polymerization are charged in a dispersing machine and then, dispersed and suspended at room temperature or a temperature set beforehand. Then, the suspended components are introduced into a reaction vessel and subjected to suspension polymerization at a defined temperature and under a defined Taylor vortex-generating condition, Although the non-volatile component in a material solution for polymerization is not especially limited, for example, an amount of 55% by weight or less is desired. This is because rapid temperature-rise in a reaction solution by a reaction heat-generation should be depressed.

The material solution for polymerization continuously supplied for a clearance between the double cylinders. A preferable continuously supplying method is supplying method by using a potential energy from a pump various types or from a tunk arranged above a reaction vessel.

It is necessary to set the double cylinder so that its center axis stretches toward a direction crossing a horizontal plane, and the axis is generally set so that the center axis stretches toward a vertical direction. This is because, if the center axis is set in such a manner as to stretch toward a horizontal direction, the Taylor vortex does not generate. Although the supplying inlet of a material solution for polymerization for the clearance between double cylinders and the outlet for taking out the solution from the clearance can be set at any place of the reaction apparatus, those are set with the apparatus so that one end side of the double cylinder is the supplying inlet and the other end side is the outlet for taking-out. In this case, there is an advantage that, if the upper side is a supplying inlet, it is easy to remove a non-reacting monomer and floating cohering products. Further, there is an advantage that, if the lower side is a supplying inlet, floating and separating of the monomer barely occur and generation of cohering products barely occurs. The rate of supplying a material solution for polymerization (a rate of a flow amount), volume of a reaction apparatus (a volume of a clearance between cylinders of the double cylinder), and polymerization time (a staying time) relates one another. Usually, once a reaction vessel is arranged, the volume of this reaction vessel is unchangable in many cases. The polymerization time is properly set according to a material for polymerization. Because of this, although it is usual to set properly the rate of supplying a material solution for polymerization judging from the reaction vessel volume and polymerization time, the present invention has not special limitation on these matters.

The polymerization time is usually in a range of from a few minutes as a lower limit to some hours as an upper limit and a preferable time is 30 minutes or more.

The polymerization temperature is usually in a range of from room temperature to about 95° C., and it is preferably determined by a radical generation temperature of an using polymerization initiator.

In this invention, polymerization occurs under a condition that a material solution for polymerization charged between an inner cylinder and an outer cylinder of a double cylinder forms Taylor vortices. The Taylor vortices is formed when at least one cylinder of an inner cylinder and an outer cylinder of a double cylinder is rotating and an angular velocity of the rotation overpasses a limit. The inner cylinder of a double cylinder may only rotate, or outer cylinder only rotate, or both of the inner and cylinders may rotate. The rotating direction may be either rightwise (so-called clockwise) or leftwise (counter clockwise). Practically, since the outer cylinder itself is a reaction vessel main body, it is arranged without rotating at a settled condition, and only the inner cylinder is arranged in such a manner as to be capable of rotating.

The inner cylinder has an outer face of a cylinder shape or it may be a cylindrical matter having a shape this kind, or its interior may be an empty space. In this case, an arrangement to carry out a heating control of this interior (for example, heating and cooling) may be installed. Since the Taylor vortex does not generate in an interior of the inner cylinder, it is proper that the bottom face of the inner cylinder may be closed to prevent invading of a material solution for polymerization into the interior of the inner cylinder. The upper end face of the inner cylinder, if required, may be closed, for example, in a case where it is designed so that a liquid level is on a lower side rather than at an upper end of the inner cylinder (that is, a case where the outlet for taking out a reaction solution is not arranged at the upper end of the inner cylinder, but on a somewhat lower side), or in case where a reaction solution enters into an interior of the inner cylinder and it is taken out to an outside, even if the upper end face is open, it is not inconvenient. In a case where the outer cylinder stretches above the inner cylinder and, at this stretched part, an outlet to take out a reaction solution is arranged, it is perfected to close the upper face of the inner cylinder in order to prevent invading of the reaction solution into an interior of the inner cylinder. A preferable material to form the inner cylinder is a material, through which a matter does not penetrate at all or does not almost penetrate, for example, a metal, glass, and ceramic, etc. Where the inner cylinder rotates a round its center axis, the center shaft is set in such a manner as to make one body with the inner cylinder. The rotating shaft is supported in such a manner as to be capable of freely rotating by shaft bearings which are set rigidly on the upper and lower faces of the outer cylinder, and it is installed on a rotating means such as a motor. A rotating shaft of the motor may make one body with the inner cylinder.

The inner and outer cylinders may be mathematically strict cylinders, but are not limited with these and may be cylinders of such a precision as commonly used in an industrial field. It is enough for the outer cylinder to have an inner face of a cylindrical shape and it is not necessary that the outer side is an cylindrical shape. The outer cylinder usually serves as the inner face of the reaction vessel main body and its lower end face (the bottom face) is closed in order to put a material solution for polymerization into an interior of the outer cylinder and, at this bottom face, a supplying inlet of the material solution is arranged. In this case, the supplying inlet may be arranged at a position on the bottom face of the outer cylinder, which corresponds to the bottom face of the inner cylinder. Doing this, the material solution can be supplied continuously from the supplying inlet in such a manner so to hit the bottom face of the inner cylinder, so that it is supplied without breaking the Taylor vortex being formed between the inner and outer cylinders. In order to get such an effect, it is preferred to arrange the supplying inlet at a position which is within an inner cylinder radius from a bottom face center of the outer cylinder, and it is more preferred to arrange the inlet at the bottom face center. A preferable material to make the outer cylinder is a material, through which a matter does not penetrate at all, for example, a metal, glass, and ceramic, etc. From a point of taking out a reaction solution without breaking the Taylor vortex, it is preferred that the outlet for taking out is arranged at an end face of the upper side of the outer cylinder (the upper face) in such a manner so as to face the upper face of the inner cylinder.

The conditions to form the Taylor vortex are represented by magnitude of a non-dimensional number Ta which is called as the Taylor number, and a preferable range of this number is a layer flow region of $Ta_{cr} \leq Ta \leq 2{,}000$ and a more preferable range is $30 \leq Ta \leq 800$. The $Ta_{cr}$ is a critical Taylor number and it a lowest limited value forming the Taylor vortex in a homogeneous system. If Ta is lower than $Ta_{cr}$, the Taylor vortex may not generate and, if it is lower than 30, sufficient stirring to prevent separation of a monomer may not be done. If Ta exceeds 2,000, the Taylor vortex is broken and the present reaction system becomes similar to that in a stirring bath. Besides, the double cylinder is set having its center axis in a vertical direction and the outer cylinder is rigidly settled without rotating, and in a case where the inner cylinder rotates, Ta is shown by the following formula;

$$Ta = (\omega \cdot R_1 \cdot b / \gamma) \cdot (b/R_1)^{\frac{1}{2}}$$

In the formula, b is a difference between radii of the inner cylinder and the outer cylinder of a double cylinder (cm);

$R_1$ is a radius of the inner cylinder (cm);

$\gamma$ is a dynamic viscosity (cm$^2$/second); and $\omega$ is a angular velocity of the inner cylinder (1/second))

If the Ta value is set in a range of the aforementioned number value, the b, $R_1$, $\gamma$, and $\omega$ values are independently and properly set, and they do not have any limitation. However, the $b/R_1$ is desired so as to be in a range of from 0.4 to 0.8 and, more preferably, to be in a range of from 0.55 to 0.65.

Where a material solution for polymerization undergoes polymerization under a condition of forming Taylor vortices, it is preferable to carry out heating and/or cooling from either one or both of the inner cylinder and the outer cylinder of the double cylinder. By doing this, efficiency of heat exchange rises and, compacting of the apparatus and/or increase of an amount to be treated can be intended. For example, in a case where heating is carried out from the outer cylinder, jackets for heating or cooling are arranged at the outside of the outer cylinder. The jackets are arranged by dividing the outside in several. areas along a direction crossing a horizontal plane and those may be jackets usable for, if necessary, both heating and cooling. In a case where the jackets are arranged several areas, a jacket at every step may be arranged capable of using each other independently.

In the present invention, the word "continuous" means not only "without cessation and slowly", but also comprises a meaning of "intermittent". In a case of being supplied intermittently, it is preferred to supply a material solution which corresponds to one of the undermentioned doughnut shape flow.

Both the completely mixing flow and the plug flow generated by Taylor vortices caused in a polymer solution being supplied continuously to a clearance between double cylinders.

As seen in FIG. 3, between the double cylinders, the material solution for polymerization 9 generates a flow having a shape of piled doughnuts which enclose the inner cylinder 2. Although the flow of piled doughnuts has overall the same rotating direction round the center axis, generating vortices in each of the doughnuts have different directions. When seen from a cross-sectional view involving the center axis 6 (both side ends of FIG. 3) in each of the doughnuts, the rotations of vortices (shown by the arrow R) show directions which are each other reverse between neighboring upper and lower doughnuts. This is a complete mixing flow. For example, the material solution is sufficiently stirred, separation and floating of a monomer is suppressed, and generation and accumulation of cohering products at the wall of a reaction vessel is suppressed.

By supplying the material solution for polymerization 9 continuously to a clearance between the double cylinders from its one end side, the flow having a shape of doughnuts being piled up moves, keeping the shape, toward the other end side of the double cylinders. This is a pushing-out flow indicated by the arrow M or N. At one end side on the supplying side, a new doughnut type flow generates. By this phenomenon, the polymerization condition in a reaction vessel becomes uniform when compared with that in a conventional reaction apparatus.

By the features of both of the completely mixing flow and the pushing-out flow, compared with a reaction in a conventional stirring bath, collision and reunification of liquid drops can be minimized and also, a treating amount may be increased and/or the apparatus may be converted into a compact type.

Since the continuous polymerization method of the present invention undergoes a polymerization reaction continuously by stirring a material solution utilizing the Taylor vortex, a large amount of polymer particles can be obtained in a short period of time, when compared with a batch method, and also, in comparison with conventional continuous methods, without accompanying an increase in the attaching amount of cohering products, the polymer particles can be obtained constantly and continuously for a long period of time. The Taylor vortex shows an excellent mixing property and, furthermore, because it is possible to enhance the heat-exchange effectivity, the method of present invention is able to correspond sufficiently to a highly exothermic reaction. The obtained polymer particles have a particle diameter distribution narrower than that of conventional continuous methods (especially, a small amount of large particles) and also, have a small average particle diameter.

Where a material solution for polymerization contains nucleus particles obtained by carrying out the emulsion polymerization of a part of the material for polymerization, there is obtained polymer particles having a further small particle diameter and a further narrow particle diameter distribution.

When the material solution for polymerization is supplied as a material-suspended solution obtained by dispersing a part or the whole of the material for polymerization in water beforehand, there is the advantage that separation of the monomer material barely occurs and polymer particles having a narrow particle diameter distribution are obtained and a forming amount to cohering products is smaller.

The continuous polymerization apparatus of the present invention can undergo the emulsion polymerization or suspension polymerization continuously under the conditions of supplying a material solution continuously without breaking the Taylor vortex.

The above, and other objects, features and advantages of the present invention will become apparent from the following description read in conjunction with the accompanying drawings, in which like reference numerals designate the same elements.

BRIEF EXPLANATION OF THE DRAWINGS

FIG. 2 is a view to explain another outline of the continuous polymerization apparatus of the present invention.

FIG. 3 is a view to explain the Taylor vortex.

FIG. 4 is a view to explain the jacket for heating and cooling and the reaction vessel main body partly in section.

FIG. 5 is a cross-sectional view of the inner cylinder.

FIG. 6 is an enlarged side view of bottom plates of the main bodies 1 and 10.

FIG. 7 is an enlarged top view of bottom plates of the main bodies 1 and 10.

FIG 8A and 8B are enlarged views to explaining the shaft bearing.

DETAILED DESCRIPTION OF THE PREFERRED EMBODIMENTS

Figure 1:
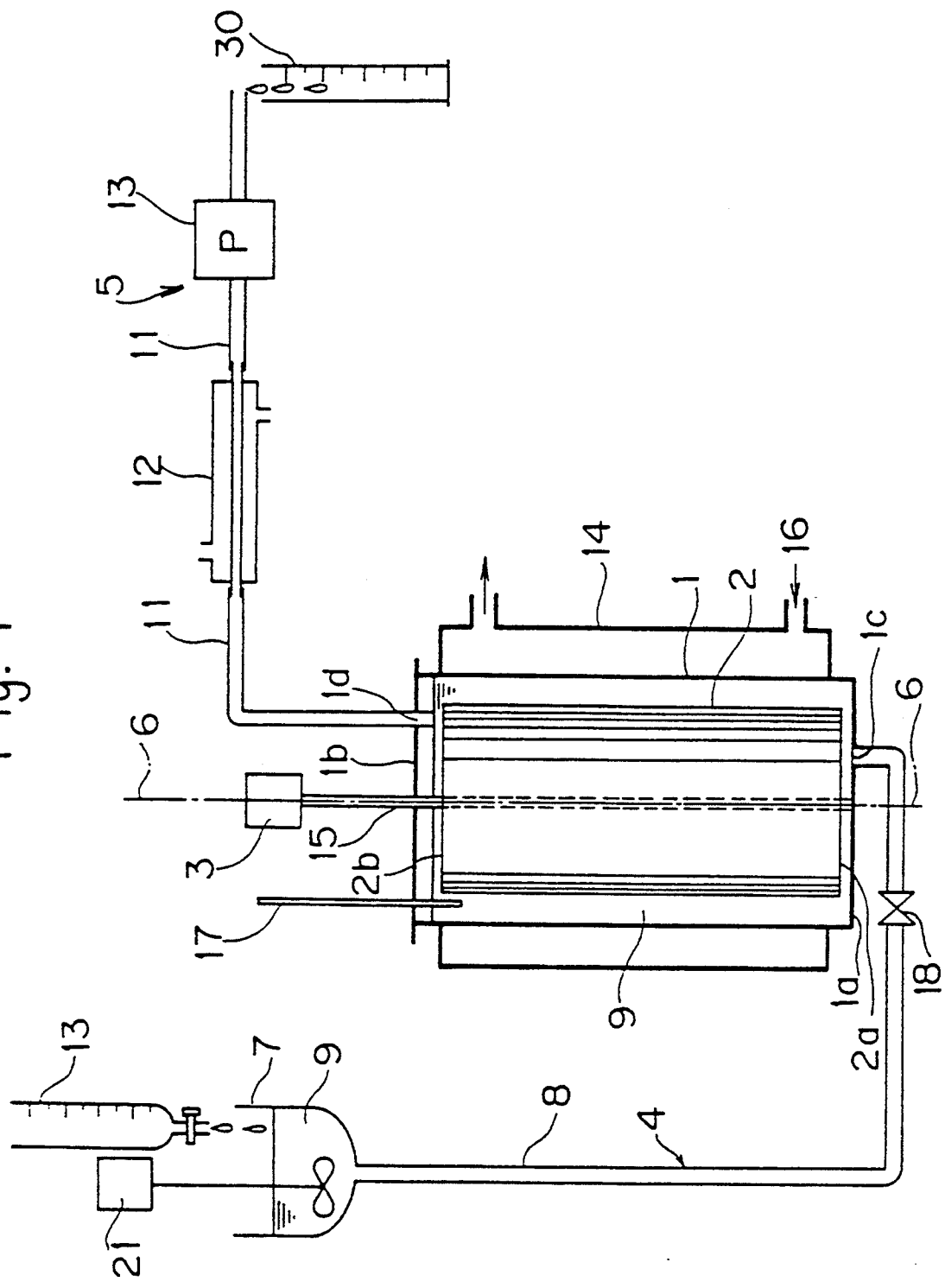
FIG. 1 is a view to explain an outline of the continuous polymerization apparatus of the present invention.

Hereinafter, the continuous polymerization method and apparatus of this invention are in detail explained referring to figures showing an outline of the apparatus, but the invention is not limited to the figure indications.

FIG. 1 shows an outline of the continuous polymerization apparatus of this invention. This apparatus has the reaction vessel main body 1, inner cylinder 2, motor 3 which is a rotating means, supplying means 4, and means for taking out 5. The reaction vessel main body 1 has a cylinder shape inner face and its provisional center axis 6 is set in such a manner so as to have a vertical direction. The inner cylinder 2 has a cylindrical stainless steel plate having an outer face to make a coaxial double cylinder with an inner face of the main body 1, and it shows a cylindrical shape by that where the lower side face (the bottom face) and the upper side face (the top face) are, respectively, closed by the bottom plate 2a and the upper plate 2b which are both made by the same material and set by welding. The inner cylinder 2, bottom plate 2a, and upper plate 2b consists of the same material, for example, a stainless steel. The bottom plate 2a and upper plate 2b of the inner cylinder are firmly set by welding with the rotating axis 15, which rotates by the motor 3. Thus, the inner cylinder 2 is able to rotate freely by the motor 3 around the center axis 6. The bottom face of reaction vessel main body 1 is a circular shape so as to face the bottom plate 2a of inner cylinder. The bottom plate 1a is set on the circular bottom face of the main body 1, and the inlet 1c to supply the material solution for polymerization 9 is installed with the bottom plate 1a so as to front on the bottom plate 2a of the inner cylinder. The supplying means 4 consists of the tank 7 to prepare a material solution for polymerization as an emulsion and the pipe route 8 which comes from a bottom face of this tank 7 to the supplying inlet 1c. In the pipe outlet 8, if necessary, the bulb 18 is arranged to control the amount of the flow. The tank 7 is installed so that its bottom face is a position higher that that of the upper plate 1b of the main body 1. Into the tank 7, a monomer is properly supplied dropwise from the dropping funnel 13 and, the stirrer 21 is set to stir the material solution 9. The taking-out outlet 1d is set on the upper plate 1b which closes the cylindrical upper face of the main body 1. The means for taking-out 5 consists of the pipe route 11, which comes from the outlet 1d to the bath for storing a reaction solution 30, and the cooler 12 and rotary pump 13 which are installed by way of pipe route 11. The jacket for heating and cooling 14 is set on the outside of main body 1. By running warm water 16 in the jacket 14 for heating and cooling, the polymerization temperature in the inside of main body 1 is properly controlled.

The material solution for polymerization 9 prepared in the tank 7 as an emulsion or a suspension comes into the main body 1 from the supplying inlet 1c through the pipe route 8 by the pull of gravity. At this time, the material solution 9 does not directly enter into the clearance which is between the inner cylinder and the outer cylinder of the double cylinder, but once it hits on the bottom plate 2a of the inner cylinder, moves in such a manner as to spread sideways, and enters into the clearance. Thus, without disturbing Taylor vortices caused between the inner cylinder and the outer cylinder, the material solution can be continuously supplied. The polymerization is carried out in the clearance between the cylinders by Taylor vortices caused by rotating the inner cylinder 2 by the motor 3 (refer to FIG. 3). During this time, if necessary, heating and/or cooling is carried out. In the course of this polymerization, the material solution 9 is continuously supplied. By doing this, the Taylor vortices gradually moves upward and, on a lower side, new Taylor vortices generate. When a thermometer 9 is set in inside of the main body 1, temperature control is easily carried out. The material solution 9 which was transferred upward is an emulsified or a suspended reaction solution and taken out by operating the rotary pump 13. If necessary, the solution 9 is cooled by the cooler 12 by way of pipe route 11. The reaction solution taken out is stored in the bath for storing 30. Polymer particles are obtained by filtering this reaction solution.

FIG. 2 shows another outline of the continuous polymerization apparatus of this invention. In this apparatus, the material solution is supplied from an upper side of the double cylinder, that is from the supplying inlet 10c arranged on the upper plate 10b of reaction vessel main body 10, and the apparatus is similar to that shown FIG. 1 except that taking-out of the reaction solution is carried out at a lower side of the double cylinder by the pull of gravity, that is from the taking-out outlet 10d set on the bottom plate 10a of reaction vessel main body 10. In the case of showing in FIG. 2, the preliminary heater 20 may be arranged so as to be capable of heating before the material solution is placed into the reaction vessel main body 10. In the apparatus of FIG. 2, both the supply and taking-out are carried out by the pull of gravity. Control of the flow amount can be carried out, for example, by the bulb 19 arranged at the pipe route on an lower side of the taking-out outlet 10d.

Although only one of the reaction apparatus using Taylor vortices is arranged in the aforementioned explanation, the reaction may be carried out by arranging several units of an apparatus of this type (a reaction vessel) in series and running the material solution in sequence and, thereby, dividing the reaction into a multistep.

Hereinafter, practical examples and comparative examples of this invention are shown, but this invention is not limited to the undermentioned examples.

At first, nucleus particles for carrying out the emulsion polymerization are produced as follows.

SYNTHETIC EXAMPLE 1

A mixture solution was made by dissolving 0.02 g of a chain-transfer agent (carbon tetrabromide) in a mixture of 8 g of styrene, 4 g of n-butyl acrylate, and 8 g of ethylene glycol dimethacrylate. On the other side, 30 g of an emulsifier (an amphoteric surfactant, made by Nippon Paint Co., Ltd., trade name "R-4820 Varnish") is neutralized by 3 g of dimethylethanolamine and then, dissolved into 450 g of deionized water, and a thus-prepared solution was warmed at 83° C. The above mixture was poured into the solution, and an obtained solution was stirred for 10 minutes and then, into this solution an aqueous initiator solution was poured (a mixture of 10 g of deionized water, 0.2 of azobiscyanovaleric acid, and 0.128 g of dimethylethanolamine), and a thus-obtained mixture was allowed to react at 83° C. for 1 hour, whereby an emulsified solution of homogeneous crosslinked nucleus particles having a particle diameter of 22 nm (seed emulsion I) was obtained.

SYNTHETIC EXAMPLE 2

The procedure of the synthetic example 1 was repeated except that ethylene glycol dimethacrylate was not used as a monomer, whereby an emulsified solution of homogeneous non-crosslinked nucleus particles having a particle diameter of 28 nm (seed emulsion II) was obtained.

In the under-described examples, apparatuses shown in FIGS. 1 and 2 were used. Details of each apparatus are as follows (refer to FIGS. 4 to 8). In FIGS. 1 to 8, a matter denoted by the same symbol and sign represents the same matter. The numeral value which represents a size in the figures has an unit of mm.

APPARATUSES SHOWN IN FIGS. 1 AND 2

Reaction Vessel Main Body 1

This was made by incorporating an upper plate consisting of a glass plate having 5 mm in thickness and 120 mm in diameter and a bottom plate consisting of a glass plate having 5 mm in thickness and 95.2 mm in diameter, with a glass pipe (heat-resistant glass) having 2.4 mm in thickness, 95.2 mm in inner diameter, and 405 mm in length, into one body by welding.

The supplying inlet was a penetrating hole having 15 mm in diameter arranged at a position 20 mm apart outward from a center of the bottom plate (which was, in an apparatus shown in FIG. 2, arranged on the upper plate) (refer to FIGS. 6 and 7).

The outlet for taking out is a penetrating hole having 15 mm in diameter arranged at a position 20 mm apart outward from a center of the upper plate (which was, in an apparatus shown in FIG. 2, arranged on the bottom plate (refer to FIGS. 6 and 7).

The shaft bearing was arranged by putting an shaft bearing plate 31 of a doughnut shape into the penetrating hole 33 having a radius of 18 mm from the centers of the upper plate and the bottom plate, wherein the bearing plate 31 had an outer diameter of 18 mm and the penetrating hole 32 of 8 mm in inner diameter, was made by a tetrafluoroethylene resin, and also, had a thickness of 5 mm (refer to FIGS. 6, 7, 8A and 8B).

The inner cylinder 2 was made by incorporating; an upper plate consisting of a stainless plate of 2 mm in thickness and 52.9 mm in diameter and a bottom plate consisting of a stainless plate of 2 mm in thickness; a bottom plate consisting of a stainless plate of 2 mm thickness and 52.9 mm in diameter; and a stainless pipe of 3. 8 mm in thickness, 60.5 mm in outer diameter, and 400 mm in length; into one body by welding.

The volume of a practically-used reaction bath (a volume of the clearance between the double cylinders made by the main body 1 and the inner cylinder 2) was 1700 cm$^3$.

The rotating shaft 15 was made by welding a stainless rod of 645 mm in length and 8 mm in diameter with the upper and bottom plates of the inner cylinder 2 and it was supported by the upper and bottom plates of the main body 1 in such a manner so as to be capable of freely rotating.

The jacket for heating 14 was made by glass (heat-resistant glass) of 3 mm in thickness, 150 mm in outer diameter, and 345 mm in length, and it was installed in such a manner so as to cover an area of 30 mm from both ends of the main body 1.

EXAMPLE 1

To 513.3 g of the solution, obtained from the synthetic example 1 and emulsified with crosslinked nucleus particles were added a monomer (a mixture of 72 g of styrene, 36 g n-butylacrylate, and 72 g of ethylene glycol dimethacrylate) and then, 0.3 g of an aqueous initiator solution (a mixture of 70.3 g of deionized water, 1.8 g of azobiscyanovaleric acid, and 1.2 g of dimethylethanolamine to prepare a monomer-emulsified product. To the apparatus shown in FIG. 2, 7,000 ml of this monomer-emulsified product were continuously supplied at a flowing amount of 50 ml per minute, an emulsion polymerization reaction was continuously carried out at an average residence time of 30 minutes, a Taylor number of from 73 to 84, and a reaction temperature of from 81° to 83° C., and a thus-obtained reaction solution was taken out from the main body 1, cooled, and sieved by a 400 mesh Tyler standard sieve, whereby polymer particles were obtained.

EXAMPLES 2 TO 5

The procedure of example 1 was repeated except that formulation of the material solutions was set as shown in Table 1 and the reaction conditions were as shown in Table 2, whereby polymerization particles were obtained.

COMPARATIVE EXAMPLES 1 AND 2

Polymer particles were obtained by carrying out the emulsion polymerization continuously under the conditions shown in Table 3 and by using a conventional reaction vessel of a multistage wing bath type. The material solutions had the same formulation to those in the examples 1 and 2 (refer to Table 1). An outline of the apparatus is as follows.

Volume: 645 ml
Inner diameter: 50 mm
Number of stage: 7
Height of one stage: 50 mm
Wing for stirring: four flat-vaned turbine having a 32 mm diameter.
Partition plate: plate having an opening of 20 mm in diameter, of which the center is the stirring shaft.
Obstacle plate: rectangular lumbers of 3 mm×3 mm were installed at three positions along the wall.
Supply: the lowest stage
Taking-out: the top stage

COMPARATIVE EXAMPLE 3

Into a 1 liter round bottom flask were placed 513.3 g of the seed emulsion I, 72 g of styrene, 36 g of n-butyl acrylate, and 72 g of ethylene glycol dimethacrylate, and an obtained mixture was warmed at a reaction temperature of 83° C. and, to this mixture and with stirring by a double helical type stirring feather, were at a stretch poured 73.3 g of an aqueous initiator solution (1.8 g of azobiscyanovaleric acid, 1.2 g of dimethylethanolamine, and 70.3 g of deionized water). Further stirring continued to ripen for 50 minutes. An obtained reaction mixture was cooled, taken out, and filtered with a 400 mesh Tyler standard sieve to obtain polymer particles. Formulation of the material solution of comparative example 3 was shown in Table 1 and the reaction conditions were shown in Table 3.

For the polymer particles obtained from the examples and comparative examples, the average particle diameter, particle diameter distribution, conversion, attaching amount of cohering products, presence or absence of air-bubble invasion, and stirring condition were examined and the results obtained are shown in Table 4.

The average particle diameter was measured by a dynamic light-scattering measurement apparatus, made by Otsuka Electronics Co. , Ltd. (trade name "LPA 3000 , 3100") and a transmission electron microscope, made by Japan Electron Optics Laboratory Co., Ltd. (trade name "JEM-2000 FX II").

The particle distribution was investigated by image processing of photographs by a transmission electron microscope.

The conversion was determined by a nonvolatile portion converting method.

The attaching amount of cohering products was determined by air-drying a residue on the 400 mesh sieve and calculating a difference by weight between this dried residue and the amount of a solid portion in the material solution (in this case, a portion passed through the sieve was regarded as only a liquid).

The presence or absence of air-bubble invasion was investigated by naked eye observation.

The stirring condition was investigated by naked eye observation of the movement of a reaction solution during the emulsion polymerization and shown by the following standard.

gentle . . . almost no wave on the air-liquid interface.
too strong . . . intensive waving on the air-liquid interface.

TABLE 1

| | Examples 1, 2 Comparative examples 1 to 3 | Examples 3 to 5 |
|---|---|---|
| Formulation of material solution (g) | | |
| Amount of solid portion in emulsion [% by weight] | 30 | 30 |
| Seed emulsion (I) | 513.3 | — |
| Seed emulsion (II) | — | 505.3 |
| Monomer mixture (St/n-BA/EGDM = 2/1/2: weight ratio) *1 | 180 | 180 |
| Aqueous initiator solution | | |
| DIW | 70.3 | 70.3 |
| ACVA *2 | 1.8 | 1.8 |

TABLE 1-continued

|  | Examples 1, 2 Comparative examples 1 to 3 | Examples 3 to 5 |
|---|---|---|
| DMEA | 1.2 | 1.2 |

(Notes)
*1: St ... styrene
n-BA ... n-butyl acrylate
EGDM ... ethylene glycol dimethacrylate
*2: DIW ... deionized water
ACVA ... azobiscyanovaleric acid
DMEA ... dimethylethanolamine

TABLE 2

|  | Example 1 | Example 2 | Example 3 | Example 4 | Example 5 |
|---|---|---|---|---|---|
| Emulsion polymerization conditions | | | | | |
| Reaction apparatus for emulsion polymerization | FIG. 2 | FIG. 2 | FIG. 2 | FIG. 1 | FIG. 1 |
| Supplying velocity of material solution [ml/minute] | 50.0 | 50.0 | 50.0 | 29.6 | 50.0 |
| Total supplying amount of material solution [ml] | 7000 | 7000 | 7000 | 6700 | 7500 |
| Average residence time [minute] | 30.0 | 30.0 | 30.0 | 50.7 | 30.0 |
| Rotating number of inner cylinder [rpm] | 50 | 50 | 50 | 50 | 20 |
| Temperature of heating and preliminary heating [°C.] | 85 | 85 | 88 | 88 | 88 |
| Taylor number (Ta) | 73 to 84 | 29 to 34 | 73 to 84 | 73 to 84 | 29 to 34 |
| Temperature in reaction bath [°C.] | 81 to 83 | 81 to 83 | 86 to 87 | 86 to 87 | 86 to 87 |

TABLE 3

|  | Comparative example 1 | Comparative example 1 | Comparative example 1 |
|---|---|---|---|
| Emulsion polymerization conditions | | | |
| Number of stage | 7 | 7 | Batch method was used. |
| Supplying velocity of material solution [ml/minute] | 33.3 | 33.3 | |
| Total supplying amount of material solution [ml] | 5000 | 5700 | 767 |
| Average residence time [minute] | 19.4 | 19.4 | 50 |
| Stirring velocity (rpm) | 200 | 100 | 150 |
| Preliminary heating water temperature | no heating | 86 | — |
| Jacket temperature [°C.] | 90 | 85 | 85 |
| Temperature of reaction bath [°C.] (at top part) | 81 to 87 | 81 to 83 | 83 |

TABLE 4

|  | Example 1 | Example 2 | Example 3 | Example 4 | Example 5 | Comparative example 1 | Comparative example 2 | Comparative example 3 |
|---|---|---|---|---|---|---|---|---|
| Results | | | | | | | | |
| Average particle diameter [nm] | | | | | | | | |
| Light-scattering | 100 | 95 | 95 | 90 | 90 | 120 | 110 | 90 |
| Electron microscopy | 40 | 40 | 40 | 30 | 30 | 40 | 40 | 40 |
| Particle diameter distribution [%] (fluctuation coefficient) | 35 | 35 | 35 | 40 | 40 | 45 | 45 | 25 |
| Conversion [%] (nonvolatile portion measurement method) | 97.0 | 98.7 | 95.3 | 95.7 | 96.7 | 92.0 | 93.0 | 98.0 |
| Attaching amount of cohering product [%] | 1.6 | 1.1 | 2.1 | 0.32 | 0.26 | 0.8 | 0.7 | 0.6 |
| Air-bubble invasion | none | none | none | none | none | none | none | none |
| Stirring condition | gentle | gentle | gentle | gentle | gentle | too strong | too strong | too strong |
| Producing amount of polymer particle [kg/m³hr] | 600 | 600 | 600 | 355 | 600 | 930 | 930 | 275 |

As seen in Table 4, the examples show particle diameter distributions in the electron microscome photographs decreased by an amount of from 10 to 20% and conversion improved by an amount of about 5%. In the examples 4 and 5, there is found an extreme reducing effect on the attaching amount of cohering products. In contrast, the comparative examples show decrease in the conversion, large particle diameter distributions, and because of a strong stirring force, there concentratedly generated cohering products on the feather surface around the material-supplying inlet. Besides, since temperature control was difficult by generating reaction heat in the comparative example 3, the supplying amount was forced to decrease.

EXAMPLE 6

Into a mixture solution of 20 g of ethylene glycol dimethacrylate, 10 g of styrene, 10 g of 2-ethylhexyl methacrylate, 38 g of lauryl methacrylate, and 22 g of hydroxypropyl methacrylate was dissolved 1 g of lauroyl peroxide, and this solution was added into an aqueous solution made by dissolving 1 g of polyvinyl alcohol (Gohsenol GH-17, made by Nippon Synthetic Chemical Industry Co., Ltd.), and an obtained solution was led to a suspending solution by 3500 rpm of a homomic line flow 30 model (a high speed emulsifier, made by Tokushu Kika Kogyo Co., Ltd.).

To the apparatus shown in FIG. 2 were continuously supplied 7,000 ml of the above-obtained suspending solution from the upper side and, by rotating the inner cylinder, the suspension polymerization was carried out at a reaction temperature of, from 81° to 83° C. with an average residence time of 180 minutes and a Taylor number (Ta) of from 73 to 84, and a reaction solution was continuously taken out from a down side of the main body 1. The obtained dispersed solution was filtered by a 200 mesh net to remove coarse particles and dried, whereby a crosslinked resin particle powder having an average particle diameter of 30 $\mu$ m was obtained. The yield was 94%.

COMPARATIVE EXAMPLE 4

A suspending solution prepared by the same formulation and method to those used for the example 6 was continuously supplied at a flowing amount of 8.3 ml per minute by using a multistep wing bath type reaction vessel to carry out continuously the suspension polymerization at a reaction temperature of from 81° to 83° C. with an average residence time of 180 minutes, and an obtained dispersed solution was filtered by a 200 mesh net to remove coarse particles and dried, whereby a crosslinked resin particle powder having an average particle diameter of 33 $\mu$m was obtained. The yield was 76%.

When the example 6 is compared with the comparative example 4, formation of large particles is less and particle distribution is narrower in the example 6, while the distribution is broader in the comparative example 4.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A continuous polymerization method comprising:

supplying continuously a material solution for polymerization into a clearance between an inner cylinder and an outer cylinder of a coaxial double cylinder from one end side of said coaxial double cylinder, an axis of said coaxial-double cylinder stretches toward a direction crossing a horizontal plane;

carrying out continuously an emulsion polymerization or a suspension polymerization while rotating at least one of said inner cylinder and said outer cylinder round said axis;

rotating said inner cylinder at an angular velocity relative to said outer cylinder sufficient to produce Taylor vortices;

a production of said Taylor vortices occurring when a Taylor number is about 30 to 2,000, wherein said taylor number is a function of a radius of said inner cylinder, a radius of said outer cylinder, a dynamic viscosity of said material solution and said angular velocity; and leading continuously a reaction solution containing a produced polymer from the other end side of said double cylinder to an outside and thus, obtaining polymer particles continuously.

2. The polymerization method according to claim 1, wherein the material solution for polymerization contains water, a polymerizable monomer, an emulsifier, and a water-soluble initiator.

3. The poolymerization method according to claim 2, wherein the material solution for polymerization contains nucleus particles for polymerization obtained from an emulsion polymerization reaction of a part of the material for polymerization beforehand.

4. The polymerization method according to claim 1, wherein the material solution for polymerization contains water, a polymerizable monomer, a dispersion stabilizer, and an oil-soluble initiator.

5. The polymerization method according to claim 4, wherein the material solution for polymerization is supplied as a material-suspended solution obtained by dispersing a part or the whole of the material for polymerization beforehand in water.

6. The polymerization method according to claim 1, wherein the material solution for polymerization is supplied from a lower end side of the double cylinder and the reaction solution is led from an upper end side of the double cylinder to an outside.

7. The polymerization method according to claim 1, wherein the material solution for polymerization is of heated and cooled from an outside of the double cylinder.

8. The polymerization method according to claim 1, wherein the at least one cylinder is rotated is the inner cylinder.

* * * * *